(12) United States Patent
Vinciarelli

(10) Patent No.: US 7,782,639 B2
(45) Date of Patent: Aug. 24, 2010

(54) ADAPTIVELY CONFIGURED AND AUTORANGING POWER CONVERTER ARRAYS

(75) Inventor: Patrizio Vinciarelli, Boston, MA (US)

(73) Assignee: VLT, Inc., Sunnyvale, CA (US)

( * ) Notice: Subject to any disclaimer, the term of this patent is extended or adjusted under 35 U.S.C. 154(b) by 476 days.

(21) Appl. No.: 11/932,647

(22) Filed: Oct. 31, 2007

(65) Prior Publication Data

US 2008/0123374 A1 May 29, 2008

Related U.S. Application Data

(60) Continuation-in-part of application No. 11/689,200, filed on Mar. 21, 2007, now Pat. No. 7,423,892, and a continuation-in-part of application No. 11/228,068, filed on Sep. 15, 2005, now Pat. No. 7,561,446, which is a division of application No. 10/959,779, filed on Oct. 6, 2004, now Pat. No. 7,212,419, which is a continuation-in-part of application No. 10/785,465, filed on Feb. 24, 2004, now Pat. No. 7,170,764.

(51) Int. Cl.
*H02J 1/00* (2006.01)

(52) U.S. Cl. ........................................... 363/65

(58) Field of Classification Search .................... 363/65, 363/67–71; 307/82, 83, 85–87, 113, 116, 307/125, 126, 130, 131
See application file for complete search history.

(56) References Cited

U.S. PATENT DOCUMENTS

| | | | |
|---|---|---|---|
| 4,533,986 A | 8/1985 | Jones | |
| 4,648,017 A | 3/1987 | Nerone | |
| 4,841,220 A | 6/1989 | Tabisz et al. | |
| 4,853,832 A | 8/1989 | Stuart | |
| 4,855,888 A | 8/1989 | Henze et al. | |
| 4,860,184 A | 8/1989 | Tabisz et al. | |
| 4,931,716 A | 6/1990 | Jovanovic et al. | |
| 5,508,905 A | 4/1996 | Reichard | |
| 5,615,093 A | 3/1997 | Nalbant | |
| 5,625,545 A | 4/1997 | Hammond | |
| 5,767,660 A | 6/1998 | Schmidt | |
| 5,786,992 A | 7/1998 | Vinciarelli et al. | |
| 5,875,104 A * | 2/1999 | Prager | 363/65 |
| 5,999,417 A | 12/1999 | Schlecht | |
| 6,222,742 B1 | 4/2001 | Schlecht | |
| 6,340,851 B1 | 1/2002 | Rinaldi et al. | |
| 6,511,764 B1 | 1/2003 | Marten | |
| 6,538,414 B1 | 3/2003 | Tsuruga et al. | |
| 6,608,770 B2 | 8/2003 | Vinciarelli | |

(Continued)

OTHER PUBLICATIONS

Watson, New Techniques in the Design of Distributed Power Systesm, etds@Vt, UVT, Aug. 7, 1998, pp. 88-115.

(Continued)

*Primary Examiner*—Matthew V Nguyen
(74) *Attorney, Agent, or Firm*—Fish & Richardson P.C.

(57) ABSTRACT

Multi-cell DC-DC power converters are described. In an adaptive version the isolated regulating multi-cell converter adaptively configures the input cells in a series connection to share the input voltage and in a parallel configuration to share the input current. Double-clamped buck-boost ZVS switching DC-DC, active clamped flyback, and flyback converter topologies may be used in the cells of the converter.

25 Claims, 7 Drawing Sheets

U.S. PATENT DOCUMENTS

| | | | |
|---|---|---|---|
| 6,788,033 | B2 | 9/2004 | Vinciarelli |
| 6,856,283 | B2 | 2/2005 | Jacobson et al. |
| 6,992,907 | B2 | 1/2006 | Zhang |
| 7,170,764 | B2 | 1/2007 | Vinciarelli |
| 7,170,767 | B2 | 1/2007 | Bixel |
| 7,212,419 | B2 | 5/2007 | Vinciarelli |
| 7,423,892 | B2 * | 9/2008 | Vinciarelli ............ 363/65 |
| 7,561,446 | B1 * | 7/2009 | Vinciarelli ............ 363/17 |
| 2001/0036088 | A1 | 11/2001 | Wittenbreder |
| 2007/0159862 | A1 | 7/2007 | Vinciarelli |

OTHER PUBLICATIONS

Baker, "High Frequency Power Conversion With FET-Controlled Resonant Charge Transfer," PCI Proceedings, Apr. 1983.

Bo Yang et al., "LLC Resonant Converter for Front End DC-DC Conversino," CPES Seminar 2001, Blacksburg, VA, Apr. 2001.

Bo Yang et al., "Low Q Characteristic of Series Resonant Converter and Its Application," CPES Seminar 2001, Blacksburg, VA, Apr. 2001.

Divan, "Design Considerations for Very High Frequency Resonant Mode DC/DC Converters," IEEE Transactions on Power Electronics, vol. PE-2, No. 1, Jan. 1987.

Erickson and Maksimovic, "fundamentals of Power Electronics," $2^{nd}$ Edition, Kluwer Academic Publishers, 2001.

Hua et al., "Novel Zero-Voltage Transition PWM Converters," IEEE Transactions on Power Electronics, vol. 9, No. 2, Mar. 1994, p. 605.

Mweene et al, "A High-Efficiency 1.5 kW, 390-50V Half-Bridge Converter Operated at 100% Duty Ratio," APEC '92 Conference Proceedings, 1992, pp. 723-730.

Palz, "Stromversorgung von Satelliten—Wanderfeldröhren hoher Leistung," ("Power Supply for Satellites—High Capacity Traveling-Wave Tubes"), Siemens Zeitschrift, vol. 48, 1974, pp. 840-846.

Severns and Bloom, "Modern DC-to-DC Switchmode Power Conversion Circuits," ISBN 0-442-2396-4, pp. 78-111, 1985.

Severns and Bloom, *ibid*, at, e.g., pp. 114-117, 136-139, 1985.

Steigerwals, "A Comparison of Half-Bridge Resonant Converter Topologies," IEEE Transactions on Power Electronics, vol. 2, No. 2, Apr. 1988.

SynQor, "Preliminary Tech Spec, Narrow Input, Isolated DC/DC Bus Converter," SynQor Document No. 005-2BQ512J, Rev. Aug. 7, 2002.

* cited by examiner

ADAPTIVELY CONFIGURED AND AUTORANGING POWER CONVERTER ARRAYS

This application is a continuation-in-part of U.S. application Ser. No. 11/689,200 filed on Mar. 21, 2007 now U.S. Pat. No. 7,423,892 (which is a division of U.S. application Ser. No. 10/959,779 filed on Oct. 6, 2004 and issued as U.S. Pat. No. 7,212,419 on May 1, 2007, which is a continuation-in-part of U.S. application Ser. No. 10/785,465 filed on Feb. 24, 2004 and issued as U.S. Pat. No. 7,170,764 on Jan. 30, 2007); and a continuation-in-part of U.S. application Ser. No. 11/228,068 filed on Sep. 15, 2005 now U.S. Pat. No. 7,561,446 (the contents of all of which are incorporated by reference).

TECHNICAL FIELD

This invention relates to the field of electrical power conversion and more particularly to regulated power conversion systems and off-line auto-ranging power supplies.

BACKGROUND

DC-DC converters transfer power from a DC electrical input source to a load by transferring energy between windings of an isolation transformer. The DC output voltage delivered to the load is controlled by adjusting the timing of internal power switching elements (e.g., by controlling the converter switching frequency and/or the switch duty cycle and/or the phase of switches). As defined herein, the functions of a "DC-DC converter" comprise: a) isolation between the input source and the load; b) conversion of an input voltage to an output voltage; and c) regulation of the output voltage. DC-DC converters may be viewed as a subset of a broad class of switching power converters, referred to as "switching regulators," which convert power from an input source to a load by processing energy through intermediate storage in reactive elements. As defined herein, the functions of a "Switching Regulator" comprise: a) conversion of an input voltage to an output voltage, and b) regulation of the output voltage. If the required output voltage is essentially a positive or negative integer (or rational) multiple of the input voltage, the conversion function may also be efficiently performed by a capacitive "Charge Pump," which transfers energy by adding and subtracting charge from capacitors.

A variety of non-isolated and transformer-isolated buck-boost switching power converters are known. In general, a buck-boost switching power converter can generate a pre-determined output voltage as its input voltage varies over a range that includes values both less than and greater than its output voltage (in the case of transformer-isolated buck-boost converters, the ratio of input to output voltage is normalized to the transformer turns ratio). In contrast, the maximum or minimum converter output voltage may be limited by the value of input voltage in other converter topologies (e.g., in a canonical buck converter the normalized output voltage cannot be greater than the input voltage; in a canonical boost converter the normalized output voltage cannot be less than the input voltage).

Flyback converters and isolated Cuk converters are known examples of isolated buck-boost switching power converters. Flyback converters using active clamp circuitry are known (see, e.g., Jitaru, "High efficiency flyback converter using synchronous rectification," APEC 2002, Volume 2, pp. 867-871; Dalal, "Design Considerations for Active Clamp and Reset Technique," 1996 Unitrode Design Seminars, SEM1100).

Using a switch to retain energy in an inductive element as a means of reducing noise and switching losses in switching power converters is described in Prager et al, "Loss and Noise Reduction in Power Converters," U.S. Pat. No. 6,522,108, issued Feb. 18, 2003, assigned to the same assignee as this application and incorporated in its entirety by reference. A buck-boost converter incorporating switches to retain energy in an inductive element and control techniques for operating the converter is described in Vinciarelli, "Buck-boost DC-DC switching power conversion," U.S. Pat. No. 6,788,033, issued Sep. 7, 2004, assigned to the same assignee as this application and incorporated in its entirety by reference.

Non-resonant full-bridge, half-bridge, and push-pull DC-to-DC transformer topologies are known. See e.g., Severns and Bloom, "Modern DC-to-DC Switchmode Power Conversion Circuits," ISBN 0-442-21396-4, pp. 78-111. Series, parallel, and other resonant forms of switching power converters are also known. See e.g., Steigerwald, "A Comparison of Half-Bridge Resonant Converter Topologies," IEEE Transactions on Power Electronics, Vol. 2, No. 2, April, 1988. Variable frequency, series resonant, half-bridge converters for operation from an input voltage source are described in Baker, "High Frequency Power Conversion With FET-Controlled Resonant Charge Transfer," PCI Proceedings, April 1983, and in Nerone, U.S. Pat. No. 4,648,017. Half-bridge, single-stage, ZVS, multi-resonant, variable frequency converters, which operate from an input voltage source are shown in Tabisz et al, U.S. Pat. No. 4,841,220 and Tabisz et al, U.S. Pat. No. 4,860,184. A variable frequency, full-bridge, resonant converter, in which an inductor is interposed between the input source and the resonant converter is described in Divan, "Design Considerations for Very High Frequency Resonant Mode DC/DC Converters," IEEE Transactions on Power Electronics, Vol. PE-2, No. 1, January, 1987. A variable frequency, ZVS, half-bridge LLC series resonant converter is described in Bo Yang et al, "LLC Resonant Converter for Front End DC-DC Conversion," CPES Seminar 2001, Blacksburg, Va., April 2001. Analysis and simulation of a "Low Q" half-bridge series resonant converter, wherein the term "Low Q" refers to operation at light load, is described in Bo Yang et al, "Low Q Characteristic of Series Resonant Converter and Its Application," CPES Seminar 2001, Blacksburg, Va., April 2001.

Fixed-frequency half-bridge and full-bridge resonant converters are also known in which output voltage control is achieved by controlling the relative timing of switches. A half-bridge, single-stage, ZVS, multi-resonant, fixed-frequency converter that operates from an input voltage source is shown in Jovanovic et al, U.S. Pat. No. 4,931,716. A full-bridge, single-stage, ZVS, resonant, fixed-frequency converter that operates from an input voltage source is shown in Henze et al, U.S. Pat. No. 4,855,888.

A full-bridge, single-stage, ZCS, series-resonant, fixed-frequency converter, operating at a frequency equal to the characteristic resonant frequency of the converter, is shown in Palz, "Stromversorgung von Satelliten—Wanderfeldröhren hoher Leistung" ("Power Supply for Satellites—High Capacity Traveling-Wave Tubes"), Siemens Zeitschrift, Vol. 48, 1974, pp. 840-846. Half and full-bridge, single-stage, ZVS, resonant, converters, for powering fluorescent tubes are shown in Nalbant, U.S. Pat. No. 5,615,093.

A DC-to-DC Transformer offered for sale by SynQor, Hudson, Mass., USA, called a "BusQor™ Bus Converter," that converts a regulated 48VDC input to a 12 VDC output at a power level of 240 Watts and that can be paralleled with other similar converters for increased output power delivery, and that is packaged in a quarter brick format, is described in data sheet "Preliminary Tech Spec, Narrow Input, Isolated DC/DC Bus Converter," SynQor Document No. 005-2BQ512J, Rev. 7, August, 2002.

The art of resonant power conversion, including operation below or above resonant frequency, utilizing either ZCS or ZVS control techniques and allowing the resonant cycle to be either completed or purposely interrupted, is summarized in Chapter 19 of Erickson and Maksimovic, "Fundamentals of Power Electronics," 2nd Edition, Kluwer Academic Publishers, 2001.

Cascaded converters, in which a first converter is controlled to generate a voltage or current, which serves as the source of input power for a DC-to-DC transformer stage, are known. A discussion of canonical forms of cascaded converters is given in Severns and Bloom, ibid, at, e.g., pp. 114-117, 136-139. Baker, ibid, discusses the use of a voltage pre-regulator cascaded with a half-bridge, resonant, variable-frequency converter. Jones, U.S. Pat. No. 4,533,986 shows a continuous-mode PWM boost converter cascaded with both PWM converters and FM resonant half-bridge converters for improving holdup time and improving the power factor presented to an AC input source. A zero-voltage transition, current-fed, full-bridge PWM converter, comprising a PWM boost converter delivering a controlled current to a PWM, full-bridge converter, is shown in Hua et al, "Novel Zero-Voltage Transition PWM Converters," IEEE Transactions on Power Electronics, Vol. 9, No. 2, March, 1994, p. 605. Stuart, U.S. Pat. No. 4,853,832, shows a full-bridge series-resonant converter cascaded with a series-resonant DC-to-DC transformer stage for providing AC bus power to distributed rectified loads. A half-bridge PWM DC-to-DC transformer stage for use in providing input power to point-of-load DC-DC converters in a DPA is described in Mweene et al, "A High-Efficiency 1.5 kW, 390-50V Half-Bridge Converter Operated at 100% Duty Ratio," APEC '92 Conference Proceedings, 1992, pp. 723-730. Schlecht, U.S. Pat. Nos. 5,999,417 and 6,222,742 shows DC-DC converters which incorporate a DC-to-DC transformer stage cascaded with a switching regulator. Vinciarelli, "Buck-Boost DC-DC Switching Power Conversion," U.S. Pat. No. 6,788,033, issued Sep. 7, 2004, assigned to the same assignee as this application and incorporated by reference, discloses a new, high efficiency, ZVS buck-boost converter topology and shows a front-end converter comprising the disclosed topology cascaded with a DC-DC converter and a DC-to-DC transformer.

In one aspect, prior art approaches to off-line power conversion may be characterized by how they accommodate a broad range of nominal line voltages, e.g., 110VAC (i.e. 85-120VAC) and 220AC (i.e. 170-240VAC). In one approach, the line is simply rectified and power conversion circuitry is designed to operate over the full range of variation of the rectified line voltage; in another approach, called "autoranging", the rectification circuitry is reconfigured based upon the nominal value of the line voltage and the range of voltages over which power conversion circuitry must operate is reduced. In another aspect, off-line power conversion may be characterized in terms of whether or not power factor correction ("PFC") is provided. Auto ranging is commonly provided in non-PFC power supplies using a capacitive voltage doubler. Referring to FIG. 1 for example, an off-line power supply includes a bridge rectifier 501, capacitors 502 and 503 connected in series across the rectifier output, and a doubler switch 506 which may be manually or automatically controlled for effecting voltage doubling. For high line voltages e.g. 220VAC the switch remains open and the rectified voltage $V_2$ will approximately equal the peak input voltage $V_{IN}$. For low line applications, the switch 506 is closed and $V_2$ will approximately equal twice the peak input voltage $V_{IN}$ and the voltage $V_2$ will remain nominally at 220V regardless of whether a 110 or 220 VAC line is connected at the input. The DC-DC converter 504 provides the voltage transformation, isolation and regulation functions for power delivered to the load 505.

Because it requires the use of energy storage capacitors at the output of the rectifiers, the capacitive voltage-doubler is not generally suitable for use in PFC applications. Vinciarelli et al., "Passive Control of Harmonic Current Drawn From an AC Input by Rectification Circuitry," U.S. Pat. No. 6,608,770, issued Aug. 19, 2003, assigned to the same assignee as this application and incorporated by reference, discloses capacitive voltage-doubling auto-ranging circuitry which passively controls the harmonic current drawn from an AC line.

Another auto-ranging approach, suitable for both PFC and non-PFC applications, is the use of a line frequency transformer with switched windings. The line voltage may be applied across all or part of the primary winding depending on the applied line voltage. In PFC applications the more common approach is use of a PFC boost converter as shown in FIG. 2. The off-line auto-ranging PFC power supply of FIG. 2 includes bridge rectifier 501, non-isolated PFC Boost converter 507, and storage capacitor 508, followed by isolated DC-DC converter 504. In order to control the current drawn from the AC line for PFC, the output voltage $V_B$ of the boost converter must be set to a voltage greater than the highest peak input voltage $V_{IN}$. In a typical power supply designed for international use, the boost voltage may be 400V. Power is then converted from the boost voltage down to the load voltage by DC-DC converter 504, which provides voltage transformation, regulation, and isolation. Operation of the boost and DC-DC converters at such high voltages includes cost and performance penalties including, lower figure of merit for switches at high voltages and safety issues for energy storage at high voltages.

One solution, disclosed in Vinciarelli et al., "Efficient Power Conversion," U.S. Pat. No. 5,786,992, issued Jul. 28, 1998, assigned to the same assignee as this application and incorporated by reference, configures isolated power converters in series and parallel allowing the combination of converters to operate over a greater voltage range.

SUMMARY

In general, one aspect features a method of converting power from a source at an input voltage for delivery to a load at a controlled output voltage. The input voltage may vary between a high line voltage and a low line voltage. A converter array having an input, an output, and a first input cell and a second input cell, each input cell having a respective number, $P_x$, of turns and an output cell having a respective number, $S_x$, of turns may be provided. Magnetic coupling may be provided between the turns to form a transformer common to the cells with the turns of the first and second input cells forming first and second primary windings and the turns of the output cell forming a secondary winding. Circuitry may be provided to operate the cells in a series of converter operating cycles. The converter operating cycles may include transferring energy from the input to the transformer via the primary windings during an energy-storage phase. An average value of primary current, having a first polarity, may flow in the primary windings and the average energy stored in the transformer may increase during the energy-storage phase. The averages, which may be greater than zero, may be taken over the duration of the energy-storage phase. The converter operating cycles may include transferring energy from the transformer via the secondary winding to the load during an energy-transfer phase. The average energy, taken over the duration of the energy-transfer phase, stored in the transformer may decrease during the energy-transfer phase. There may be a complete or a substantial absence of temporal overlap between the energy-storage and the energy-transfer phases. The input cells may be configured in a parallel connection for operation at the low line voltage and in a series connection for operation at the high line voltage. Circuitry may be provided to control the output voltage.

Implementations of the method may include one or more of the following features. Each input cell may be driven by a voltage essentially equal to the input voltage in the parallel connection and by a voltage essentially equal to one-half of the input voltage in the series connection. Primary switches having a maximum voltage rating that is lower than the high line voltage may be used. A circuit may be provided to sense the input voltage and to automatically configure the input cells in the series or parallel connections in response to the input voltage. A clamp capacitor may be connected to the transformer during the energy-transfer phase. A switch may be used to connect the clamp capacitor to a second end of a primary winding. Capacitive coupling may be provided between the respectively poled second ends of the primary windings. A resonant circuit may be formed during the energy-transfer phase between a primary-referenced leakage inductance, $L_L$, and the clamp capacitor, $C_C$. The resonant circuit may have a characteristic time constant, $T_R=\text{pi}*\text{sqrt}(L_L*C_C)$. The converter operating cycle may have a minimum operating period, $T_{oc-min}$, that is greater than the characteristic time constant $T_R$. The capacitance of the clamp capacitor may be set to control the slew rate of current in the secondary winding, enabling secondary switches to be turned ON under conditions of essentially zero voltage and at currents less than the peak secondary current. The clamp capacitor may be connected to the primary winding during the energy-transfer phase. The converter operating cycles may include a clamp phase during which at least one of the primary windings is clamped with essentially zero voltage across and an average value of current flowing in the clamped primary winding. The average current over the duration of the clamp phase may have a polarity opposite the first polarity. A power factor correction circuit may be provided. Parasitic capacitances may be charged and discharged during a ZVS phase following the end of the clamp phase. One, or more, or all of the primary windings may be clamped. A clamp switch may be used on the first end of one of the primary windings and a unidirectional conduction device may be used on the respectively poled first end of one or more of the other primary windings. The converter operating cycles may include ZVS transitions during which parasitic capacitances associated with first primary switches connect to the first end of the primary windings or second primary switches connected to the second end of the primary winding are charged or discharged to allow each respective primary switch to be turned ON or OFF at times when the voltage across said respective primary switch is essentially at or near a minimum. The converter operating cycles may include a first ZVS transition of the first primary switches, during which transitions in the second primary switches are delayed. A second ZVS transition of the second primary switches may follow, and commence essentially at the end of, the first ZVS transition. A brief conduction state may follow the first and precede the second ZVS transition. An essentially zero voltage may be across and an average value of current having the first polarity may flow in the primary winding during the conduction state.

In general, one aspect features a method of converting power from an input source at an input voltage for delivery to a load over a normal operating range. A switching power converter array may be provided having an input, an output, a number, N, of input cells, and a number, M, of output cells, and where M+N is greater than 2. Each input cell may have a primary winding having a respective number, $P_x$, of turns and at least one primary switch to drive the primary winding. Each output cell may have a secondary winding having a respective number, $S_x$, of turns. Magnetic coupling may be provided between the windings to form a transformer common to each of the input and output cells. At least two of the cells may be stacked with each stacked cell being connected in series with the other stacked cells. Each stacked cell may share a respective fraction of the input or output voltage according to its respective number of turns. Circuitry may be provided to operate the cells in a series of converter operating cycles during which power received from the input is converted via the transformer for delivery to the load.

Implementations of the method may include one or more of the following features. The number, N, of input cells may be 2 or more and the input cells may be stacked to share the input voltage. The number, M, of output cells may be 2 or more and the output cells may be stacked to share the output voltage. Each converter operating cycle may include transferring energy from the input to the transformer via the primary windings during an energy-storage phase. An average, taken over the duration of the energy-storage phase, value of the primary current, having a first polarity, may flow in the primary windings during the energy-storage phase. The average, taken over the duration of the energy-storage phase, value of the energy stored in the transformer may increase during the energy-storage phase. Energy may be transferred from the transformer via the secondary winding to the load during an energy-transfer phase. The average, taken over the duration of the energy-transfer phase, value of energy stored in the transformer may decrease during the energy-transfer phase. There may be a complete or a substantial absence of temporal overlap between the energy-transfer phase and the energy-storage phase. Circuitry may be provided to control the output voltage. A clamp capacitor may be connected to the transformer during the energy-transfer phase. At least one of the primary windings may be clamped during a clamp phase with essentially zero voltage across and an average value of current flowing in the clamped primary winding. The average, taken over the duration of the clamp phase, value of current may have a second polarity opposite to the first polarity. The capacitance of the clamp capacitor may be set to control the slew rate of current in the secondary winding(s) to enable switches connected to the secondary winding(s) to be turned ON under conditions of essentially zero voltage and at a current less than a peak value of the current in the secondary winding(s). A resonant circuit may be formed during the energy-transfer phase between a primary-referenced leakage inductance $L_L$ and clamp capacitor $C_C$, having a characteristic time constant, $T_R=\text{pi}*\text{sqrt}(L_L*C_C)$. The converter operating cycle may have a minimum operating period, $T_{oc-min}$, that is greater than the characteristic time constant $T_R$. A resonant circuit may be formed including the transformer and having a characteristic resonant frequency and period. The converter operating cycle may include two power transfer intervals of essentially equal duration, during which one or more of the primary switches are ON and power is transferred from the input cells to the output cell(s) via the transformer, and voltages and currents in the input cells and output cell(s) rise and fall at the characteristic resonant frequency. The converter operating cycle may include two energy-recycling intervals each having an essentially constant duration over the normal operating range during which the primary switches are OFF. Magnetizing current may be used to charge and discharge capacitances during the energy-recycling intervals. Primary switches having a maximum voltage rating that is lower than the input voltage may be used.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
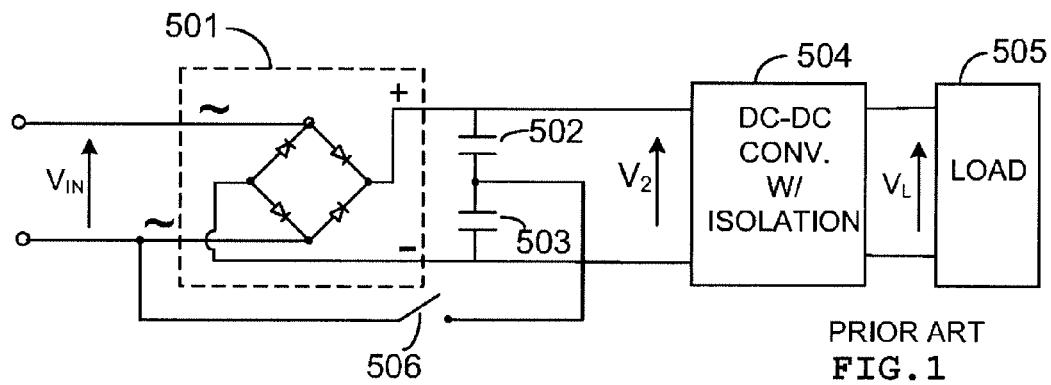
FIG. 1 shows a prior art off-line auto-ranging power supply.
Figure 2:
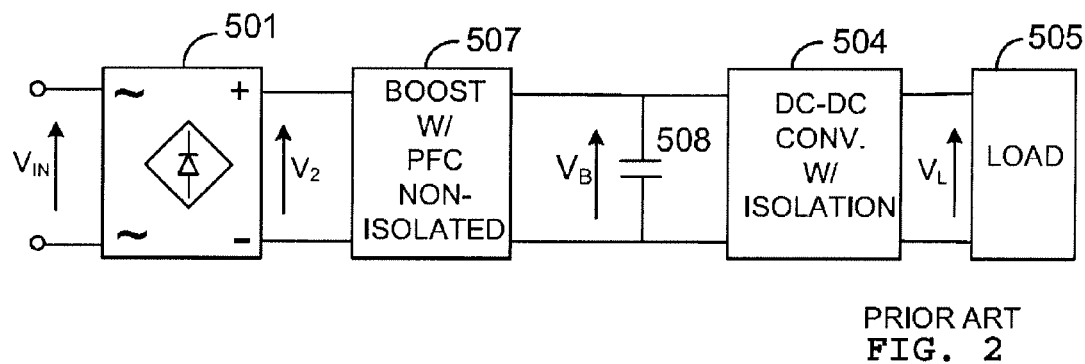
FIG. 2 shows a prior art off-line auto-ranging power supply with power factor correction.
Figure 3:
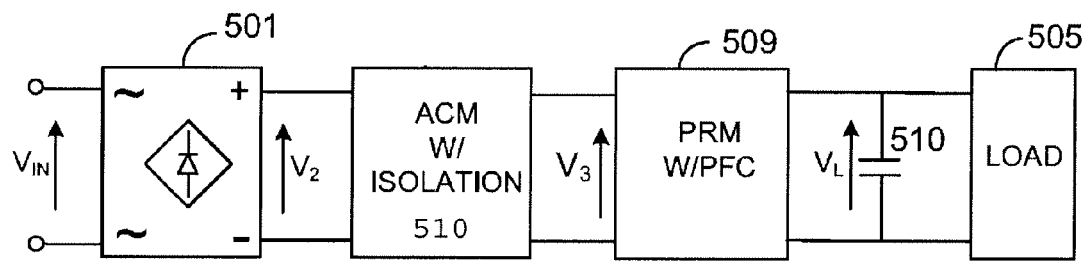
FIG. 3 shows an off-line auto-ranging power supply using an auto-ranging converter module cascaded with a power factor corrected power regulator module.

An auto-ranging off-line power supply topology using adaptively configured voltage transformation modules (shown in FIG. 3) is described in Vinciarelli, "Adaptively Configured and Auto-ranging Voltage Transformation Module Arrays," U.S. Pat. No. 7,212,419, issued May 1, 2007, (the "Adaptive VTM Patent") assigned to the same assignee as this application and incorporated here by reference. Referring to FIG. 3, the auto-ranging off-line power supply includes a full-wave rectifier (in this case a bridge rectifier) 501, an auto-ranging converter module ("ACM") 510, and a power regulator module 509. The ACM 510 provides auto-ranging, voltage transformation, and isolation and may optionally provide regulation. The voltage, $V_2$, at the output of the rectifier 501 is a function of the AC input voltage, $V_{IN}$, and may therefore vary over a large range. For example, in auto-ranging off-line applications the RMS line voltage may vary between 85 and 275 VAC, RMS, corresponding to peak rectified line voltages in the range of 120V to 389V. In other application examples, the RMS line voltage may vary over a narrower range between 100V and 240V. The ACM 510 may be configured to transform the relatively high peak rectified line voltage, $V_2$, to a relatively lower voltage, $V_3$, (e.g. having a peak value of 50V) allowing downstream capacitive energy storage, regulation, and PFC to be provided at the lower voltage. Better figure of merit switches may be used in the PFC and regulation circuitry while energy storage at the lower voltage may be safer.

Figure 4:
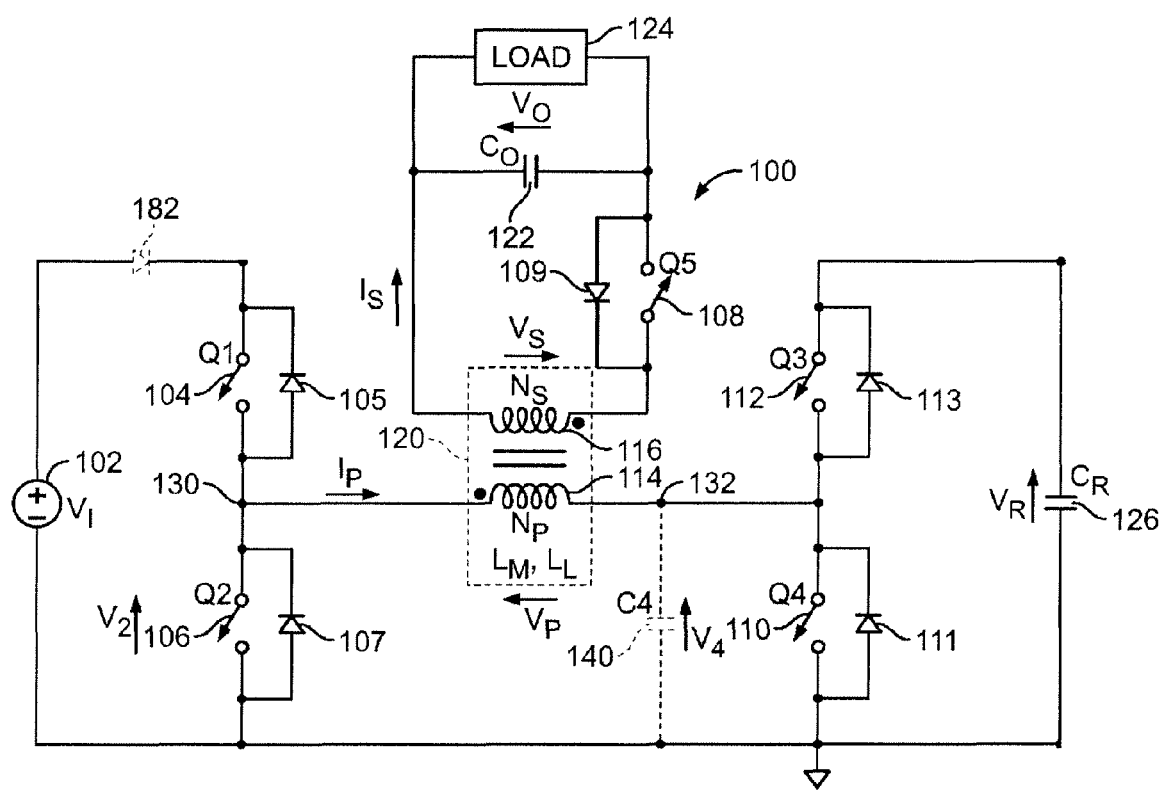
FIG. 4 shows a schematic of a double-clamped ZVS buck-boost power converter.

An isolated buck-boost DC-DC converter that comprises both an active clamp circuit and a clamp phase, in which all of the power switches in the converter may be switched ON at zero-voltage thereby reducing switching losses, referred to herein as a "double-clamped ZVS buck-boost" converter (the "DCZVS converter") is shown in FIG. 4 and described in Vinciarelli, "Double-Clamped ZVS Buck-Boost Power Converter," U.S. patent application Ser. No. 11/228,068, filed Sep. 15, 2005, (the "DCZVS patent application") assigned to the same assignee as this application and incorporated here by reference. Referring to FIG. 4, the DCZVS converter 100 is shown including transformer 120, characterized by a turns ratio $N=N_S/N_P$, where $N_S$ and $N_P$ are, respectively, the number of turns in the secondary winding 116 and in the primary winding 114 of transformer 120. The transformer may be also characterized by a magnetizing inductance of value, $L_M$, and primary-referenced primary-to-secondary leakage inductance of value, $L_{L\,P\text{-}S}$, where both $L_M$ and $L_{L\,P\text{-}S}$ may be set, by design, to pre-determined, finite, values and where, generally, the magnetizing inductance is much greater than the leakage inductance ($L_M \gg L_{L\,P\text{-}S}$). Converter 100 includes primary switches Q1 104, Q2 106, and Q4 110 (each having a respective parallel connected diode 105, 107, 111) connected to the primary winding 114 in the circuit. Secondary switch Q5 108 and its parallel connected diode 109 are connected to the secondary winding 116. Clamp switch Q3 112 along with its associated parallel connected diode 113 and clamp capacitor $C_R$ 126 form an active clamp circuit. Switches Q2 and Q4 together provide another clamp circuit. MOSFET devices may be used for any or all of switches Q1-Q5 in which case the intrinsic body diode of the MOSFET may be used for the parallel-connected diode.

The circuit components shown in FIG. 4 in dashed lines (capacitor $C_4$ 140 and diode 182) are optional and may be added to the basic converter topology 100 (shown in solid lines). The optional capacitor $C_4$ 140 is discussed below however, the reader is directed to the DCZVS patent application for details concerning the optional diode 182.

The DCZVS converter 100 receives power from input source 102 which delivers a unipolar input voltage, $V_I$, to the converter input. The converter delivers power to load 124 at an output voltage, Vo, which is rectified and smoothed by secondary circuitry, including secondary switch Q5 108, parallel diode 109, and output filter capacitor $C_o$ 122. In general, the magnitude of both the input voltage, $V_I$, and the load 124 may vary over a range of values.

Although the DCZVS converter 100 may be operated in different modes as described in detail in the DCZVS patent application, operation of the adaptive DC-DC converter examples shown in FIGS. 5 and 6 will be described utilizing the first operating mode ("Mode 1" or "M1"). Mode 1 may be characterized by a timing architecture that preferably includes six phases (the Energy Storage, ZVS A, Energy Transfer, ZVS B, Clamp, and ZVS C phases) and by the clamp capacitor, $C_R$ 126 preferably having a relatively small capacitance. However, the Mode 1 timing architecture may be used regardless of the size of the clamp capacitor. (By way of contrast, the second operating mode, "Mode 2" or "M2", may be characterized by a timing architecture that preferably includes eight phases (the Energy Storage, ZVS A1, Input Storage, ZVS A2, Energy Transfer, ZVS B, Clamp, and ZVS C phases) and by the clamp capacitor, $C_R$ 126, preferably having a much larger capacitance. Also, the reconfigurable converter 100B as described in the DCZVS Application may be adapted to change between Mode 1 and Mode 2.) The timing architecture of the DCZVS converter 100 and the adaptive DC-DC converters 200 and 400 are described in more detail below in connection with FIGS. 7A-7I.

Figure 5:
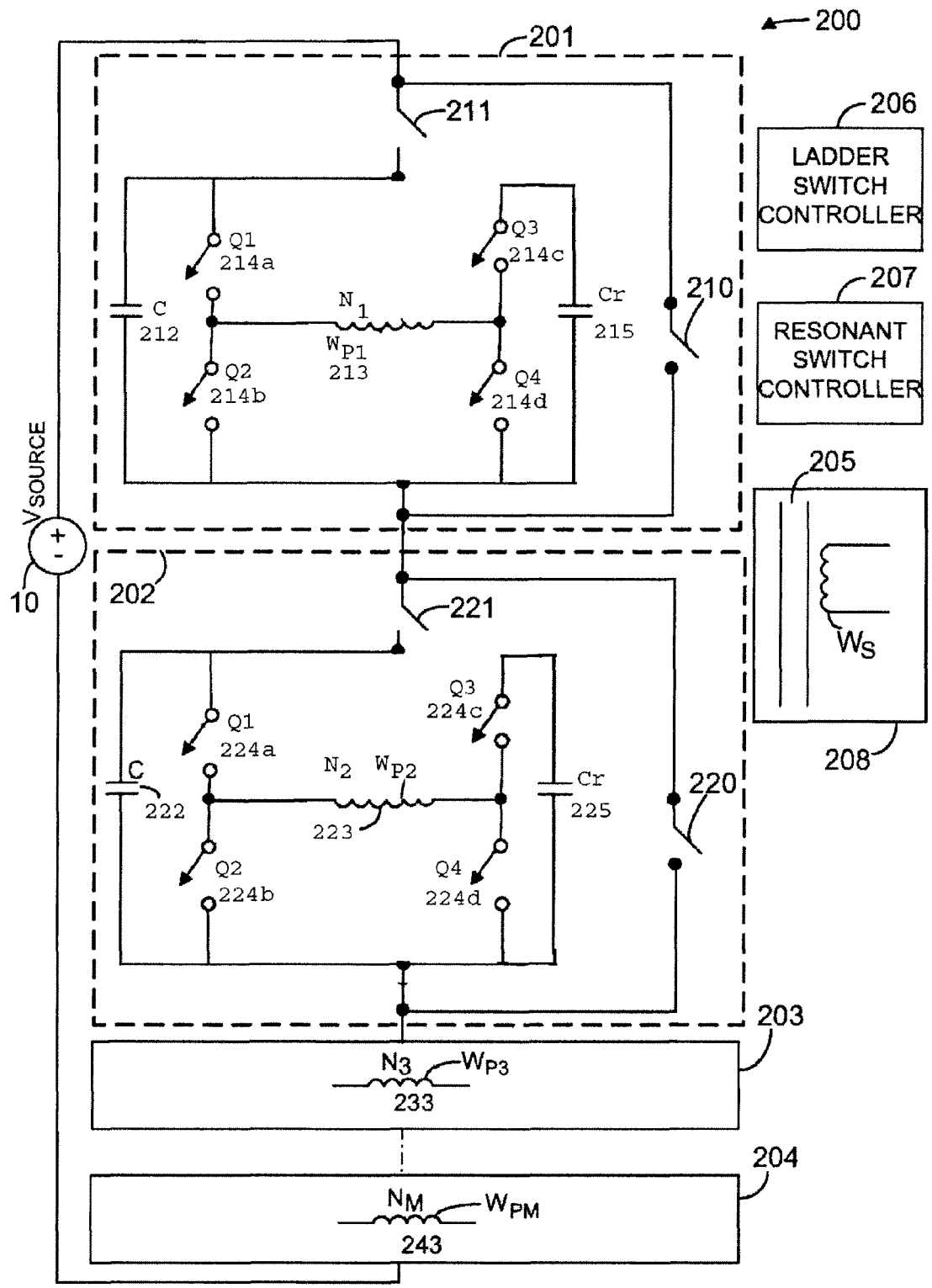
FIG. 5 shows a schematic diagram of a power converter having an array of double-clamped ZVS buck-boost input cells adaptively configured in series and coupled with a common output cell.

Referring to FIG. 5, a generalized adaptive converter array 200 using the DCZVS converter topology is shown having a plurality of input cells 201, 202, 203, and 204 coupled to a common output cell 208. The input cells may be the same as the primary circuit of FIG. 4 with the addition of a bypass capacitor, e.g. capacitors 212 and 222, a series switch, e.g. series switches 211, 221, and a shunt switch, e.g. shunt switches 210, 220 for each cell. Also the primary windings $W_{P1}, W_{P2}, W_{P3}, \ldots W_{Pm}$ may be part of one transformer 205 having a single secondary winding $W_S$ coupled to the output circuit 208. The number of turns $N_1, N_2, N_3, \ldots N_m$ in the primary windings may be selected to provide the appropriate transformation ratio for each cell. A ZVS controller 207 common to all of the cells may operate the primary switches Q1-Q4 of all of the input cells (and the synchronous rectifiers in the output cell if used) in synchronism.

The input cells of the adaptive DC-DC converter 200 may be switched in and out of the series combination as required to coarsely adjust the aggregate transformation ratio and thus configure the adaptive converter 200 to the applied input voltage. When an input cell is in the circuit, its series switch e.g. 211, 221 is closed and its shunt switch e.g. 210, 220 is open. Conversely, when an input cell is switched out of the circuit its series switch e.g. 211, 221 is open and its shunt switch e.g. 210, 220 is closed. The ladder switch controller 206 controls the series and shunt switches of all of the cells. An input cell that is switched out of the circuit may remain active (i.e., its primary switches may continue to operate) and its bypass 212, 222 and clamp 215, 225 capacitors will essentially remain charged. However, in rush current may be controlled during reconfiguration of the ladder switches by controlling the ladder switch transitions i.e. by traversing slowly through the linear region of the series and shunt switches as the cells are reconfigured. The ladder switch controller 206 may sense the input voltage and optionally may also sense the load voltage to configure the input cells. When connected in series, each input cell shares in a fraction of the input voltage equal to the number of its primary winding turns divided by the total number of turns for all of the input cells that are connected in the array (i.e., where the term "connected" refers to cells whose shunt switches are open and whose series switches are closed). Furthermore, some cells in such an array may be permanently connected and not include series and shunt switches.

Figure 6:
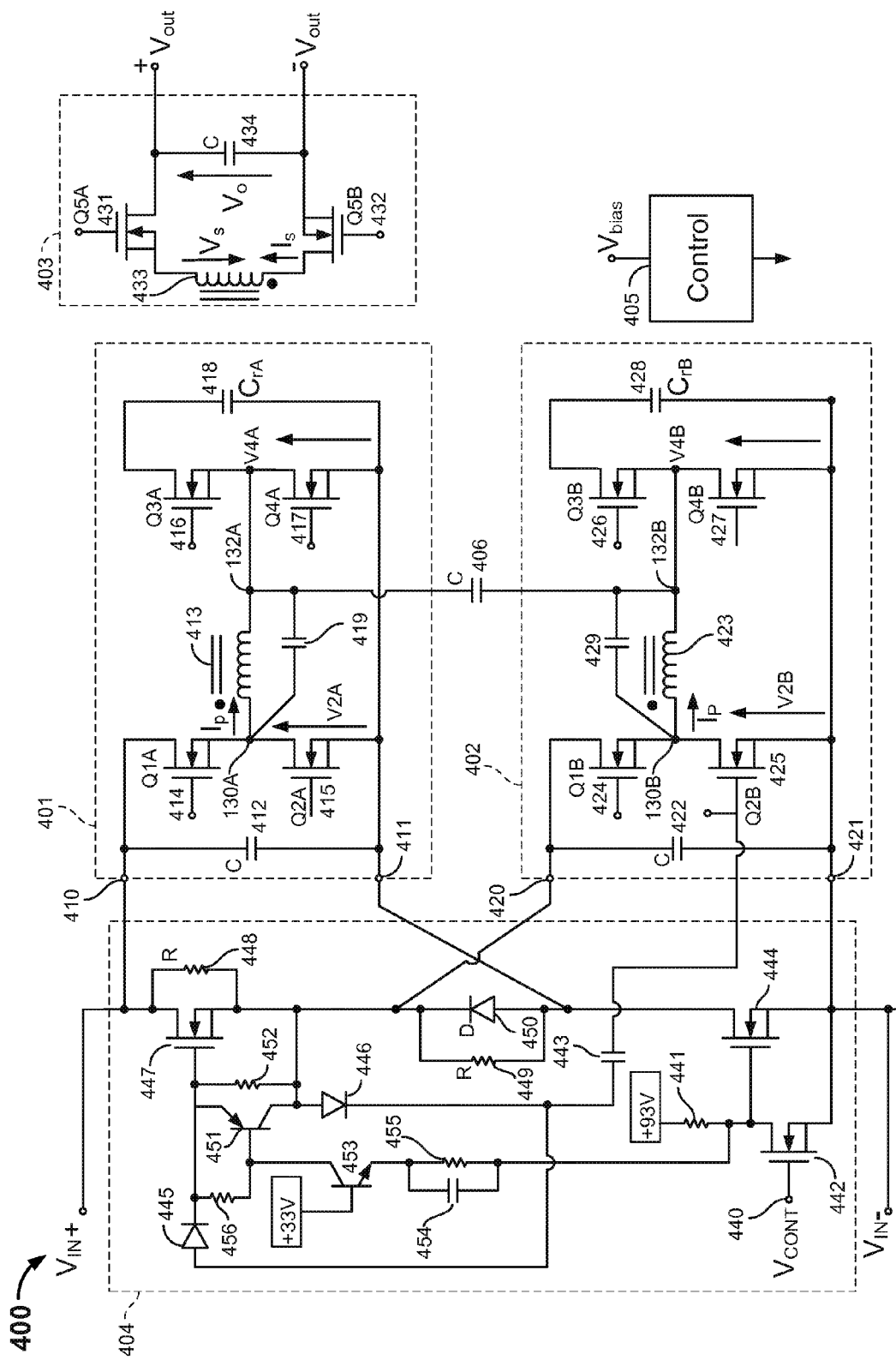
FIG. 6 shows a schematic diagram of a power converter having an array of double-clamped ZVS buck-boost input cells adaptively configured in series or parallel and coupled with a common output cell.

Referring to FIG. 6, an adaptive DCZVS converter array is shown configured to provide the functions of off-line auto-ranging voltage transformation, isolation, regulation, and optionally PFC. As shown in the figure, the adaptive regulator 400 includes three cells based upon the DCZVS converter topology: a pair of input cells 401 and 402 and output cell 403. The input cells 401, 402 include primary windings 413, 423 magnetically coupled to secondary winding 433. Primary switches Q1A 414 and Q4A 417, and Q1B 424 and Q4B 427 drive each primary winding with the voltage applied across the cell input terminals 410, 411 and 420, 421. Capacitors 412 and 422 are scaled to provide filtering on a time scale that is large relative to the operating frequency of the converter input cells and small relative to the line frequency. Output circuitry connected to the secondary winding 433 rectifies the secondary voltage and supplies a DC output voltage Vo for delivery to a load (not shown in FIG. 6). Although a single output switch Q5 may be used as shown for example in the output circuit of FIG. 4, two output switches Q5A 431, Q5B 432 are shown providing rectification in the output cell 403 in FIG. 6 allowing lower voltage devices and thus lower ON-resistance devices to be used. Switching control circuit 405 may operate the switches (Q1A, Q1B, Q2A, Q2B, Q3A, Q3B, Q4A, Q4B, Q5A, and Q5B) in a series of converter operating cycles according to a timing architecture (as described below) e.g. using gate drivers not shown to turn the switches ON and OFF. Power for the switching control circuit, at a relatively low voltage, $V_{BIAS}$, may be derived from the input voltage, $V_{IN}$, through an auxiliary winding coupled to the input cells. A capacitor 406 may be used to connect the finish ends (nodes 132A, 132B) of transformer windings 413, 423 (in input cells 401, 402) providing a gate drive return path as shown in FIG. 6 when driving the gate of switch Q3A with a capacitively-coupled driver.

A configuration controller 404 as shown in FIG. 6 may be used to adaptively connect the input cells 401, 402 in a series and a parallel configuration to provide an auto-ranging function. For control voltages at the control terminal, $V_{CONT}$, 440 that remain below a predetermined threshold, the configuration controller 404 holds switches 447 and 444 ON establishing the parallel connection of the input cells 401 and 402. In the parallel connection, terminals 420 and 411 will be respectively connected to $V_{IN+}$ and $V_{IN-}$ through switches 447 and 444 and unidirectional conduction device 450 will remain reverse biased. Conversely, when the control voltage at the control terminal, $V_{CONT}$, 440 exceeds a predetermined threshold, the configuration controller 404 holds switches 447 and 444 OFF forward biasing unidirectional conducting device 450, essentially connecting terminals 411 and 420 together, and establishing the series connection of input cells 401 and 402. Terminals 411 and 420 will be essentially at $V_{IN}/2$ for the series connection.

While the voltage at the control terminal 440 remains below a predetermined threshold (e.g., below a value that causes the gate voltage of transistor 442 to stay below its gate threshold voltage), switch 442 remains OFF which allows resistor 441 to pull up the drain of transistor 442 and the gate of transistor 444. This turns switch 444 ON and also turns transistors 453 and 451 OFF, allowing the gate drive signal from switch 425 of input cell 402, shown coupled through capacitor 443 and diodes 445 and 446, to charge the gate-source capacitance of switch 447 turning switch 447 ON. Preferably, the gate bias voltage is sufficient to ensure that transistor 447 is fully ON for operation in the parallel configuration. With switches 447 and 444 ON, the input cells are configured in the parallel configuration, each receiving the full input voltage across its respective input terminals, 410, 411 and 420, 421. The parallel connection of the input cells allows each cell to share in the power delivered by the output cell 403 reducing the current carried by the primary switches.

With a sufficiently large positive voltage applied to the control terminal $V_{CONT}$ 440, transistor 442 is turned ON pulling its drain low, holding the gate to source voltage of transistor 444 near zero keeping transistor 444 OFF. The low drain voltage at transistor 442 also turns transistors 453 and 451ON discharging the gate-source capacitance of switch 447 and holding the gate to source voltage of transistor 447 near zero thus keeping transistor 447 OFF. With switches 447 and 444 OFF, the input cells are connected in series (through diode 445) across the input voltage, Vin. The series connection of the input cells divides the input voltage between the input cells reducing the voltage stresses on and requirements of the primary switches 414, 415, 416, 417 and 424, 425, 426, 427 in each cell.

Preferably, the peak line voltage may be sensed and used to set and latch the control signal $V_{cont}$ to prevent the adaptive DC to DC converter array from reconfiguring the input cells as the voltage changes throughout the AC cycle. Alternatively, the configuration may be switched during the AC cycle for example when more than 2 input cells are provided. Circuitry for sensing the peak line voltage and delivering a control signal $V_{cont}$ may be included in switching control circuit 431.

The switching control circuit 405 in FIG. 6 operates the primary switches of each input cell in synchronism with the respective switches in the other input cell or cells as the case may be. The timing architecture remains the same whether the input cells are connected in series or parallel by the configuration controller 404 in FIG. 6 or in series by the ladder switches of FIG. 5.

Generally the primary winding in each input cell in an adaptive DC converter may have a unique number of turns relative to the other input cells. However, because the input cells 401, 402 in the adaptive DC converter 400 of FIG. 6 are switched between a series connection (in which the input voltage is divided between the input cells) and a parallel connection (in which the input current is divided between the input cells), the primary windings should be configured having an equal number of turns and similar characteristics to equally share the voltage and power in the series and parallel connections, respectively.

Figure 8:
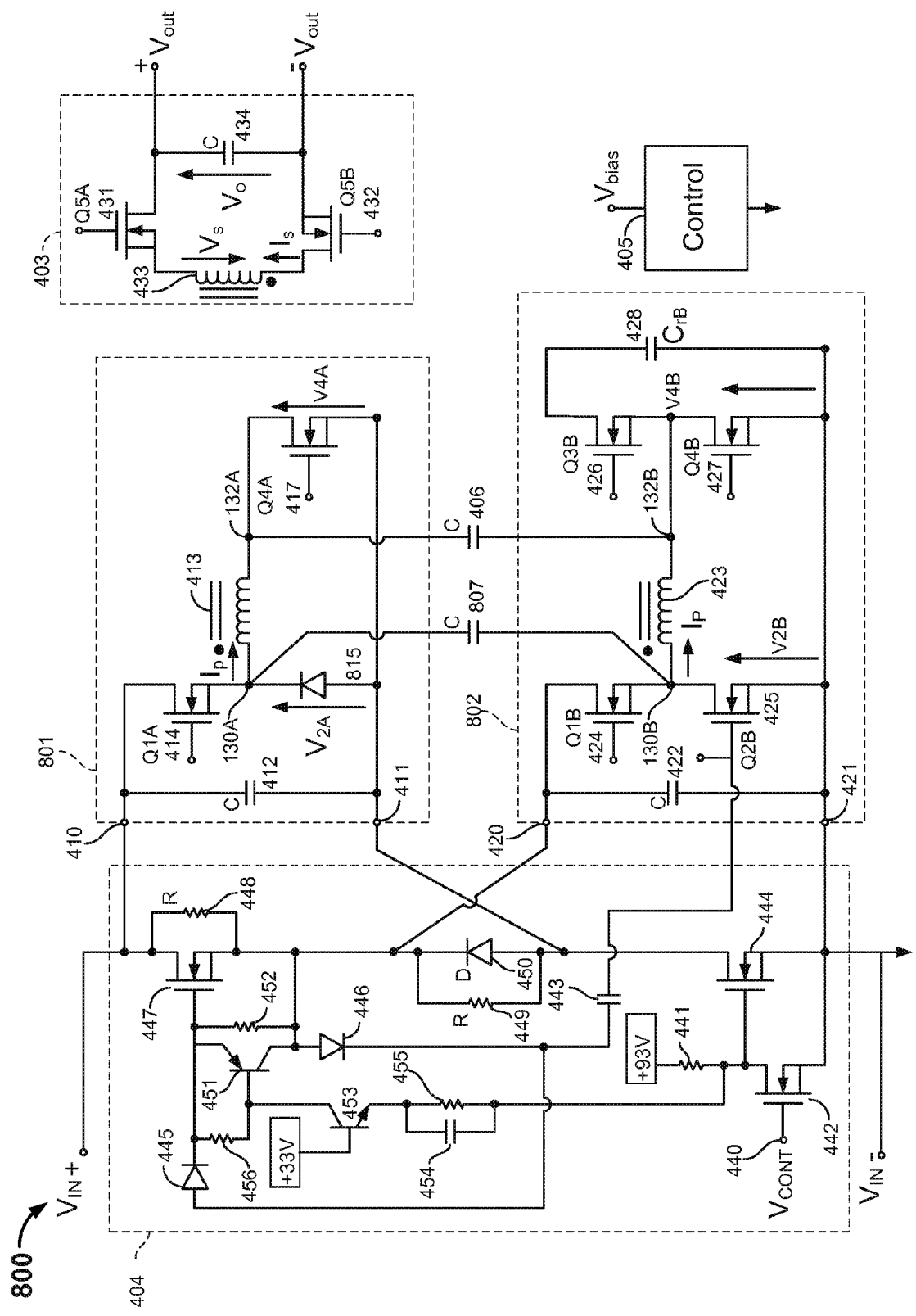
FIG. 8 shows a schematic diagram of a power converter having an array of main and auxiliary double-clamped ZVS buck-boost input cells adaptively configured in series or parallel and coupled with a common output cell.

Each input cell of a multi-input cell converter may use the full primary configuration illustrated in FIG. 4. Examples of multi-input cell converters are shown in FIGS. 5, 6, and 8. Input cell 802 in FIG. 8, input cells 401, 402 in FIG. 6 and input cells 201, 202 in FIG. 5 are all examples of the full primary configuration. An alternative approach is to set up one of the input cells using the full primary configuration as the "main input cell" and some or all of the remaining input cells using an auxiliary primary configuration as the "auxiliary input cell(s)". FIG. 8, provides an example of the main-auxiliary input cell approach in adaptive converter 800 which employs the same basic two input cell adaptive DC to DC converter structure 400 of FIG. 6.

The example shown in FIG. 8 has the low-side input cell 802 configured as the main input cell using the full primary configuration and the high-side input cell 801 configured as an auxiliary input cell using the auxiliary primary configuration. One advantage in configuring the input cells with the full primary configuration at the low-side input cell 802 as shown in FIG. 8 is the resulting simplified ground-referenced gate drive for switch Q2B (which is absent in the auxiliary input cell). As shown in FIG. 8, switch Q2 (415 in FIG. 6) may be replaced with diode 815 in the auxiliary input cell 801 and clamp capacitor $C_{rA}$ and switch Q3A (respectively 418 and 416 in FIG. 6) may be omitted altogether. A second capacitor 807 may be added to connect the start ends (nodes 130A, B) of the primary windings 413, 423. Capacitor 406 (introduced in FIG. 6 to provide a return path for the Q3A gate drive current) serves the second function in FIG. 8 of providing a connection between the finish ends (nodes 132A, 132B) of the primary windings for clamping operations as described below. Therefore, capacitors 807 and 406 respectively connect node 130A to node 130B and node 132A to node 132B as shown in FIG. 8 forcing each node (130A, 132A) in the auxiliary input cell to track its respective node (130B, 132B) in the main input cell. The operation of the main-auxiliary input cell combination will be described below in connection with the timing architecture. However, the same timing architecture may be used whether the converter uses the main-auxiliary input cell configuration of FIG. 8 or the main-main input cell configuration or FIG. 6.

Waveforms for the timing architecture of converters 100, 200, 400, and 800 of FIGS. 4, 5, 6, and 8 are shown in FIGS. 7A-7I. Unless otherwise noted in the following description, a reference to Q1, Q2, Q3, Q4, Q5, V2, or V4 refers to the correspondingly labeled switches or voltages in the single input cell converter of FIG. 4, the multi-input cell converters of FIGS. 5 and 6, and the main and auxiliary input cells of the multi-input cell converter of FIG. 8. Note that the switches and voltages in FIGS. 6 and 8 also carry an A or B suffix (Q1A, Q1B, Q2A, Q2B, Q3A, Q3B, Q4A, Q4B, Q5A, Q5B, V2A, V2B, V4A, and V4B). The waveform shown in FIG. 7E for Q5 describes for example the operation of switches Q5A 431 and Q5B 432 in the output cell 403 of FIGS. 6 and 8 as well as Q5 shown in FIG. 4. Similarly, the waveforms illustrated in FIGS. 7A and 7D for Q1 and Q4 respectively describe the operation of switches Q1A, Q1B and Q4A, Q4B in FIGS. 6 and 8 in addition to the Q1 and Q4 switches shown in FIGS. 4 and 5. The waveforms for Q2 and Q3 respectively illustrated in FIGS. 7B and 7C respectively describe the operation of switches Q2A, Q2B and Q3A, Q3B in FIG. 6, switches Q2B and Q3B in FIG. 8, and the Q2 and Q3 switches shown in FIGS. 4 and 5. Finally, the waveforms for V2 and V4 respectively illustrated in FIGS. 7H and 7I describe the behavior of voltages V2 and V4 respectively at nodes 130 and 132 in FIG. 4 and voltages V2A, V2B and V4A, V4B at nodes 130A, 130B and at nodes 132A, 132B, respectively, in FIGS. 6 and 8 except as otherwise noted.

Operation of the full input cell configuration will be described in connection with FIGS. 4 and 6. References to circuit elements other than the switches will be made using the reference designations in FIG. 4 to avoid confusion. However, it should be understood that the description may reference the corresponding circuit element in FIGS. 5, 6, and 8. Variations in operation between the main and auxiliary inputs cells in FIG. 8 owing to their structural differences will be described below.

Referring to FIGS. 7A-7I, a converter operating cycle, having a converter operating period of duration $T_{M1}$, is shown having a series of phases, described in detail below. Each phase in the converter operating cycle may be characterized by its function (e.g., enabling storage of energy in the transformer) and the states of the switches Q1-Q5 during the phase. The following description assumes that the value of the output filter capacitor $C_o$ (122 FIG. 4; 434 FIGS. 6, 8) is sufficiently large to maintain the converter output voltage, Vo, at an essentially constant level.

1. Energy Storage Phase.

Figure 7A:
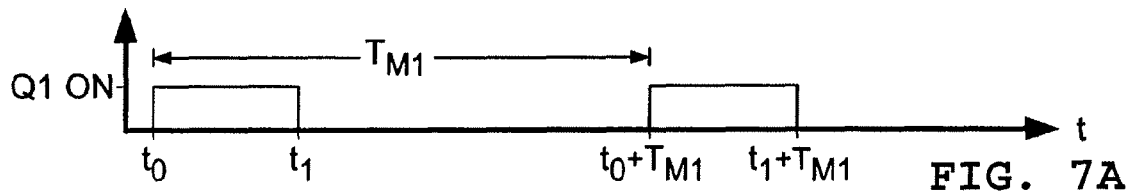
FIGS. 7A-7I show waveforms during various phases of operation of the power converters of FIGS. 4 5, and 6.
Figure 7B:
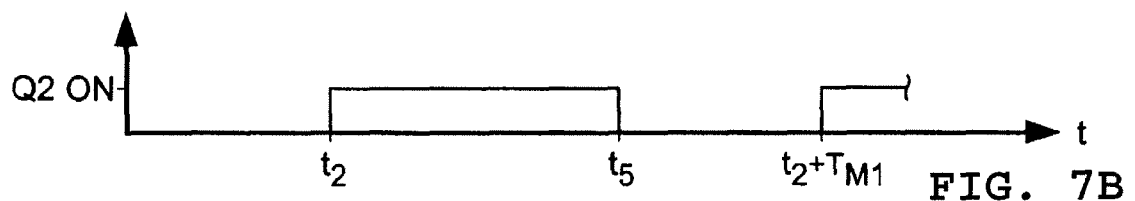
Figure 7C:
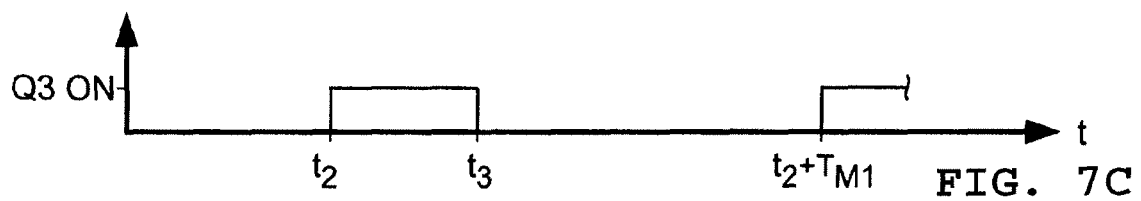
Figure 7D:
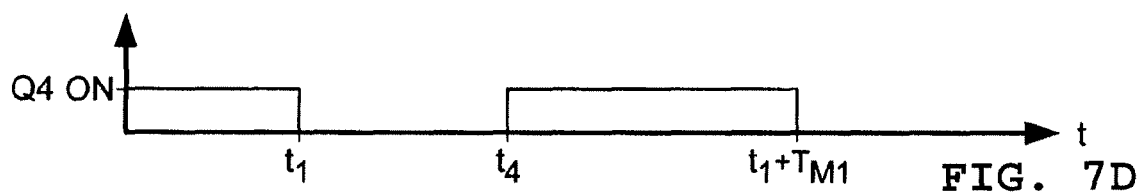
Figure 7E:
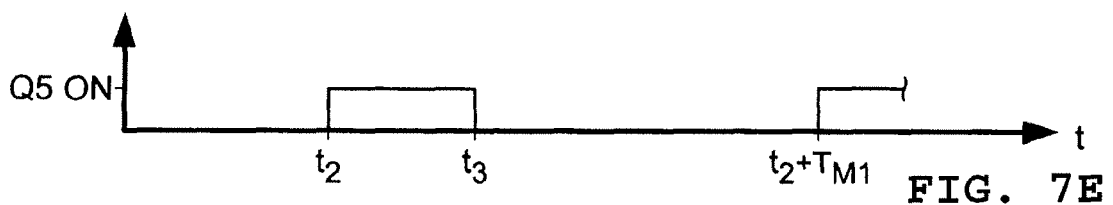
Figure 7F:
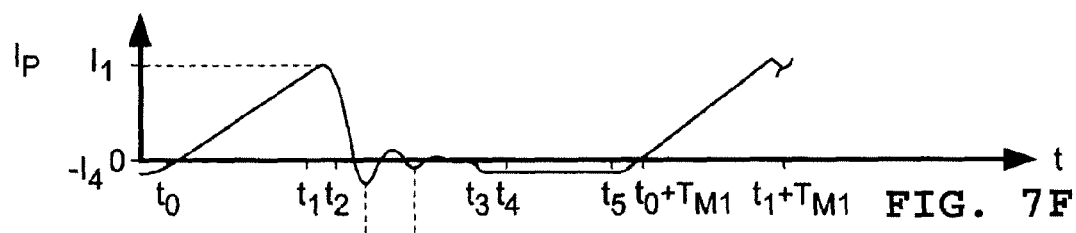

At time $t_o$, switch Q4 may remain ON (FIG. 7D) from the last phase of the previous converter operating cycle and switch Q1 may be turned ON (FIG. 7A), initiating an energy-storage phase. During the energy-storage phase, a primary current $I_P$ (FIG. 7F) flows from the input source (102 FIG. 4) into the primary winding (114 FIG. 4) of the transformer (120 FIG. 4). As shown in FIG. 7F, the primary current ramps up during the energy-storage phase reaching a maximum current, $I_P=I_1$, shortly after switches Q1 and Q4 are turned OFF at the end of the energy-storage phase (e.g., at time $t_1$). The primary current, $I_P$, is positive and flows in the direction of the arrow (FIG. 4) at time $t_1$. An average of the primary current, taken over the duration of the energy-storage phase, is positive using the conventions shown in FIGS. 4, 6, and 8. With switch Q5 OFF and the polarities of the transformer windings as indicated, and ignoring leakage currents, the secondary current, $I_S$, is zero throughout the energy-storage phase of the operating cycle. The main 802 and auxiliary 801 input cells in FIG. 8 operate in the same manner described above during the Energy Storage Phase.

2. ZVS Phase A.

Switches Q1 and Q4 may be turned OFF at or shortly after time $t_1$, terminating the energy-storage phase, blocking further energy transfer between the input source and the transformer, and initiating zero-voltage switching ("ZVS") phase A of the converter operating cycle. As used herein, ZVS refers to partially or fully charging and discharging circuit capacitances to achieve a reduction or complete elimination of the voltage across a switch as a means of reducing switching losses when the switch is turned ON. When switch Q1 turns OFF, the positive flow of current in the primary winding, $I_P$ charges and discharges the parasitic and other capacitances associated with node 130 (FIG. 4) and 130A and 130B (FIGS. 6, 8), including the parasitic capacitances of switches Q1 and Q2 (and Diode 815 in the case of the auxiliary input cell 801 in FIG. 8) and additional capacitors 419, 429 in FIG. 6, causing the voltage V2 (FIG. 4), V2A and V2B (FIGS. 6, 8) to decline towards zero in preparation for ZVS turn ON of switch Q2. When Q4 turns OFF, the positive flow of current $I_P$ charges and discharges the capacitances associated with node 132 (FIG. 4) 132A, 132B (FIGS. 6, 8) including the parasitic capacitances of switches Q3 and Q4, and optional capacitance C4 140 in the case of FIG. 4, and optional capacitances C 419 and 429 in the case of FIG. 6, causing the voltage V4 at node 132 (FIG. 4), voltages V4A, V4B at nodes 132A, 132B (FIGS. 6, 8) to increase in preparation for ZVS turn ON of switch Q3.

At time $t_2$, the voltage V2 (FIG. 7H) at node 130 (FIG. 4) is clamped to essentially zero volts by conduction of diode 107 and, at approximately the same time, the voltage V4 (FIG. 7I) at node 132 is clamped to the clamp voltage, $V_R$, across clamp capacitor, $C_R$ 126, by conduction of diode 113. As will be discussed below, the clamp voltage, $V_R$, is essentially equal to the primary-reflected value of the output voltage, $V_o$, i.e. $V_R \approx V_o/N$. Therefore, at time $t_2$ the secondary voltage, $V_S$ (FIG. 4), is negative and essentially equal to $V_o$ and the voltage across Q5, and its associated parasitic capacitance $C_{P5}$ 136 (FIG. 4), is also approximately zero.

In some implementations, it may be desirable to keep Q4 turned ON for a short time after Q1 is turned OFF and completes it ZVS transition, i.e. the voltage V2 at node 130 reaches a minimum or low clamp voltage level, to provide a definite sequence of events in turning switches Q1 and Q4 OFF. Keeping switch Q4 ON until the voltage V2 at node 130 is clamped by the conduction of the internal body diode of switch Q2 may potentially add a brief (~10 nS) conduction state with switches Q2 and Q4 being ON simultaneously. This brief conduction state will be very similar to the clamp phase described below, however, the current through the primary winding carried by switches Q2 and Q4 during this brief conduction state will essentially be at the peak value and will have a positive polarity using the conventions shown in FIGS. 4, 6, and 8.

The main 802 and auxiliary 801 input cells of FIG. 8 operate in essentially the same manner during the ZVS A phase as that described for FIG. 4 with voltages V2B, V2A (FIG. 7H) at nodes 130B, 130A in the main 802 and auxiliary 801 input cells each being clamped at time $t_2$ to essentially zero volts respectively by conduction of the internal body diode (not shown) of switch Q2B and diode 815. The voltage V4B (FIG. 7I) at node 132B may be clamped to the clamp voltage, $V_R$, across clamp capacitor, $C_{RB}$ 428, by conduction of the internal body diode (not shown) in switch Q3B. Voltage V4A at node 132A however may also be clamped essentially to the clamp voltage, $V_R$, across clamp capacitor, $C_{RB}$ 428 using the path provided by capacitor 406. The current through the magnetizing inductance and the primary-referenced primary-to-secondary leakage inductance is clamped directly through switch Q3B and the clamp capacitor 428. However, current through the small inter-primary leakage inductance $L_{L\,P413}$ referenced to primary winding 413 may be clamped to the clamp voltage using capacitor 406. Interleaving the primary windings provides very good coupling between the primary windings thus minimizing the inter-primary leakage inductance $L_{L\,P413}$.

As the capacitances at nodes 130 and 132 (FIG. 4) 130A, 130B and 132A, 132B (FIGS. 6, 8) charge and discharge during ZVS phase A, the voltage across the primary winding(s) ($V_P$ shown in FIG. 4) will vary from an initial positive value at the beginning of the phase to a negative value at the end of the phase. Thus, as shown in FIG. 7F, the primary current, $I_P$, will continue to increase during a first portion of ZVS phase A and will decline during the remainder of the phase.

3. Energy Transfer Phase.

At about time $t_2$, switches Q2, Q3, and Q5 may be turned ON and switches Q1 and Q4 may be kept OFF (continuing to block energy transfer between the input source and the transformer), initiating an energy-transfer phase of the converter operating cycle. Because the voltage across each of switches Q2, Q3, and Q5 is essentially zero at time $t_2$, the switches turn ON essentially without loss.

After time $t_2$ the output voltage $V_o$ is reflected back into the primary of the transformer 120 as a negative voltage $V_P = -V_o/N$. If there were no transformer leakage inductance, $L_{L\,P-S}$ (not shown), the energy stored in the magnetizing inductance, $L_M$, (not shown) of the transformer would immediately commutate into the secondary winding and transfer energy toward the load. Owing to the presence of leakage inductance, however, instantaneous commutation to the secondary is impeded.

The leakage inductance $L_{L\,P-S}$ and the clamp capacitor $C_R$ 126 (FIG. 4) form a damped resonant circuit (the damping being caused by the presence of circuit resistances (not shown) including, e.g., the resistances of switches Q2, Q3, and Q5 and the transformer windings). As noted earlier, the inductance $L_{L\,P-S}$ may comprise the primary-referenced leakage inductance of the transformer alone or may additionally comprise an inductance connected in series with transformer windings. The main input cell 802 of FIG. 8 operates in the same manner with the transformer leakage inductance $L_{L\,P-S}$ (primary to secondary) and the clamp capacitor $C_R$ 126 (FIG. 4) forming a damped resonant circuit. However, in the auxiliary input cell 801, the small inter-primary leakage inductance $L_{L\,P413}$ forms a damped resonant circuit with capacitors 807 and 406.

As illustrated in FIG. 7F, during the period following time $t_2$ a damped resonant current, $I_P$, flows in the primary winding. The secondary current shown in FIG. 7G, $I_S = I_3/N = (I_2 - I_P)/N$, comprises: (1) a trapezoidal component, indicated between times $t_2$ and $t_3$ in FIG. 7G by a dashed line, associated with commutation of magnetizing energy into the secondary (i.e., current $I_2/N = I_1/N - (N \cdot V_o)(t-t_2)/L_M$, where $I_1 = I_P(t_2)$ is the peak value of the primary current, $I_P$, at time $t_2$) and (2) an oscillatory component corresponding to the secondary-reflected value of the primary current $I_P$ flowing in the primary-referenced leakage inductance $L_{L\,P-S}$. The net effect is a rise in secondary current $I_S$ with a controlled slew rate from an initial value of zero at time $t_2$. Therefore, at about time $t_2$ switch Q5 (FIG. 4), Q5A, Q5B (FIGS. 6, 8) may be turned ON under essentially zero-current and essentially zero-voltage conditions. In less ideal embodiments, switch Q5 (FIG. 4), Q5A, Q5B (FIGS. 6, 8) may be turned ON at a current less than the peak value.

Figure 7G:
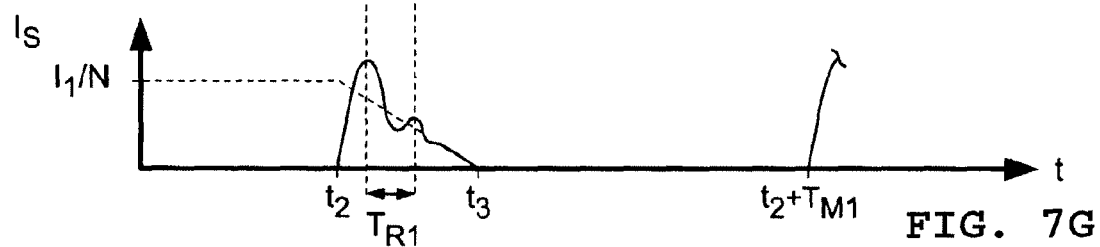
Figure 7H:
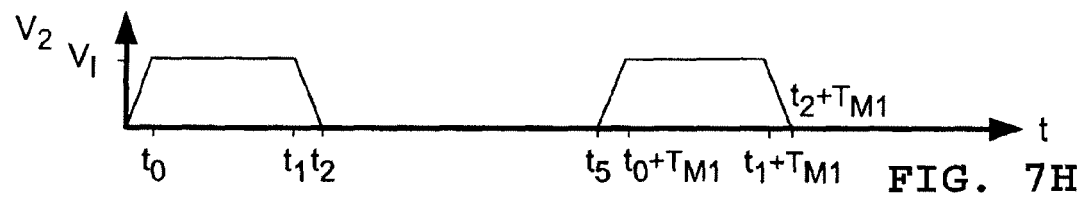
Figure 7I:
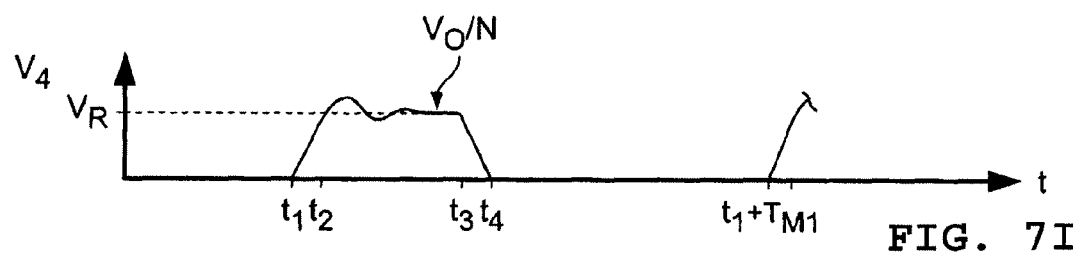

The voltage across Q4 ($V_4$, node 302) is shown in FIG. 7I. During the energy-transfer phase (i.e., the interval between times $t_2$ and $t_3$), the primary winding 114 (FIG. 4) is effectively connected in parallel with the clamp capacitor $C_R$. Therefore, as time $t_3$ approaches, voltage $V_4$ approaches a steady-state value essentially equal to the primary-reflected value of the output voltage $V_o$, i.e. $V_R \approx V_4 = V_o/N$.

As illustrated in FIG. 7G, the resonant period, $T_{R1}$, of the resonant circuit formed by the clamp capacitor $C_R$ and the leakage inductance $L_{L\_P-S}$ preferably is relatively short compared to the converter operating period, $T_{M1}$, in Mode 1. As a result, energy transferred from the leakage inductance to the clamp capacitor is essentially released to the secondary prior to the end of the energy-transfer phase. In the absence of the clamp capacitor (126 in FIG. 4), the leakage inductance would, at time $t_2$, resonate with the parasitic capacitance of node 132, resulting in a relatively high frequency and high amplitude oscillation, producing undesirable high-frequency noise and dissipation of energy stored in the transformer leakage inductance. On the other hand, if the value of $C_R$ was made relatively much larger so that the resonant period, $T_{R1}$, is long relative to the operating period of the converter, $T_{M1}$, (as in the case of a flyback converter with active clamp) a circulating current would flow in switch Q3 throughout the entire duration of the energy-transfer phase causing dissipation. The optimal value of $C_R$ for Mode 1 operation may be chosen to limit the slew rate of the secondary current, $I_S$, and to be just large enough to enable Q5 to be turned ON after Q1 and Q4 are turned OFF, but before $I_S$ reaches its peak value. This is particularly important in low output voltage converters where the forward voltage drop of the body drain diode of switch Q5 is much larger than the voltage drop across switch Q5 in its ON state. In such low output voltage applications, slew rate limiting of $I_S$ by a suitably chosen value of clamp capacitance $C_R$ may be used to optimize converter efficiency. In general, the value of $C_R$ is best determined empirically depending on the specific requirements of the application, including choice of operating frequency and transformer leakage inductance. The same considerations apply to the main and auxiliary input cells shown in FIG. 8 for the clamp capacitor 428 in relation to the primary-423-referenced primary-to-secondary leakage inductance $L_{L\_P-S}$ reflected to primary winding 423 and for capacitors 406, 807 in relation to the primary-413-referenced inter-primary leakage inductance $L_{L\_P413}$.

4. ZVS Phase B.

At time $t_3$ the primary current $I_P$ is essentially zero; the secondary current, $I_S$, has declined to zero; and the voltage across open switch Q4 is essentially equal to $V_4=V_o/N$. Switches Q5 and Q3 may be turned OFF at or shortly after time $t_3$, initiating ZVS phase B of the converter operating cycle.

During ZVS phase B (i.e., the interval between times $t_3$ and $t_4$), the capacitance at node 132 (FIG. 4) discharges resonantly back through the transformer primary inductance ($L_{PRI} \approx L_M + L_{L\_P-S}$). The capacitance at node 132 (FIG. 4), 132B (FIGS. 6, 8) may consist entirely of parasitic capacitances or may comprise additional capacitance in the form of a discrete capacitor connected across switch Q4 as illustrated in FIG. 4, (capacitor $C_4$ 140 shown in dashed lines). Alternatively, the capacitance at both ZVS nodes (nodes 130 and 132) may be supplemented using a single capacitor connected between the two nodes, i.e., across the primary winding as illustrated in the two input cells of FIG. 6 (capacitors 419, 429 connected across primary windings 413, 423 to supplement the capacitance at nodes 130A, 132A and 130B, 132B respectively). At time $t_4$, a negative current, $I_P$, flows in the primary winding of the transformer and as the voltage $V_4$ at node 132 attempts to reverse in polarity, the body drain diode 111 of switch Q4 conducts, clamping the voltage $V_4$ to essentially zero volts in preparation for ZVS turn ON of switch Q4 and ending ZVS phase B.

The main-input cell 802 operates in the manner described with the capacitance at node 132B (FIG. 6) discharging resonantly back through the transformer primary inductance and through switch Q2B which is still conducting during ZVS phase B. The diode 815 in the auxiliary cell 401 may eventually become reversed biased due to the negative primary current $I_P$ flowing in primary winding 143 due to the inter-primary leakage inductance. However capacitors 807 and 406 provide a path for the negative primary current allowing the voltages V2A and V4A at nodes 130A and 132A to closely follow the voltages V2B and V4B at nodes 130B and 132B and preparing Q4A for ZVS switching also.

5. Clamp Phase.

At about time $t_4$, switch Q4 is turned ON (under ZVS conditions) to form a short circuit (in conjunction with switch Q2 which remains ON from ZVS phase B) across the primary winding, initiating a clamp phase of the converter operating cycle. During the clamp phase, one or more windings of the transformer may be shunted by a low resistance shunt path which clamps the voltage across the winding(s) to essentially zero volts while carrying a current flowing in the winding, e.g., switches Q2 and Q4 form a short circuit across the transformer primary winding in FIG. 4. As shown in FIG. 7F, a current ($I_P = -I_2$), is flowing in the primary winding at time $t_4$ at the beginning of the clamp phase (the "initial current"). The short duration of the clamp phase and the very low resistance of the shunt path (e.g. the ON resistance of switches Q2 and Q4) minimize dissipation for the energy stored in the transformer, thereby allowing energy to be retained in the transformer until the end of the clamp phase when switch Q2 is turned OFF. Thus, the current flowing in the clamped winding at the end of the clamp phase (the "remaining current") may be essentially equal to the initial current (as exemplified in FIG. 7F by the lack of change in the current ($I_P = -I_2$) during the clamp phase from time $t_4$ to time $t_5$). An average of the primary current, taken over the duration of the clamp phase, has a negative polarity using the conventions shown in FIG. 4.

Although the remaining current is shown having essentially the same absolute value as the initial current in FIG. 7F, dissipation due to circuit resistances will generally cause a reduction in current. As explained below, the remaining current need only be sufficient to partially or completely charge and discharge the capacitances at node 130 for the purpose of providing ZVS for switch Q1 during turn ON, allowing for partial dissipation in some ZVS embodiments or complete dissipation in non-ZVS embodiments. The remaining current therefore may have an absolute value that is greater than zero or substantially the same as the initial current.

The main-input cell 802 in FIG. 8 clamps primary winding 423 operating in essentially the same manner as described above with switches Q2B and Q4B forming an essentially short circuit across primary winding 423 until time $t_5$. Generally only one transformer winding is required for the clamp phase, allowing switch Q2 in the auxiliary input cells (e.g. Q2A in auxiliary cell 801) to be replaced with a diode (815). Capacitors 807 and 406 essentially tie nodes 130A and 132B together and nodes 134A and 134B together to carry the current flowing in winding 413 in the auxiliary input cell 801 due to the small inter-primary leakage inductance during the clamp phase.

6. ZVS Phase C.

At the end of the clamp phase (time $t_5$), switch Q2 may be turned OFF initiating ZVS phase C of the converter operating cycle. The remaining current i.e., the negative current flowing in the shunted transformer primary winding at the time, $t_5$, when switch Q2 is turned OFF, charges and discharges the parasitic capacitances associated with node 130, causing the voltage $V_2$ to increase. At time $t_o+T_{M1}$, the voltage $V_2$ is clamped by diode 104 to be essentially equal to the input source voltage $V_1$, leaving the voltage across Q1 essentially zero in preparation for ZVS turn ON of switch Q1.

In order to ensure that the voltage across switch Q1 can be brought to zero, there must be sufficient negative current flowing in the transformer primary winding at the beginning of the clamp phase at time $t_4$, which means that there must be sufficient energy stored in the capacitance at node 132 at the beginning of ZVS phase B at time $t_3$ to ensure that the energy stored in the transformer at time $t_4$ (i.e., the beginning of the clamp phase) is sufficient to enable the parasitic capacitance at node 130 to be charged to a voltage essentially equal to $V_I$. In some cases the parasitic capacitance at node 132 may be sufficient to ensure this; in other cases additional capacitance may be added at node 132 (e.g. capacitor $C_4$ 140 in FIG. 4) or across nodes 130 and 132 (e.g. capacitors 419, 429 across nodes 130A-132A, 130B-132B respectively as illustrated in FIG. 6). Similar configurations may be used at node 132B in FIG. 8.

The main-input cell 802 (FIG. 8) operates in the manner described during ZVS phase C with switch Q2B being turned OFF at about time $t_5$ and the remaining current i.e., the negative current flowing in shunted transformer primary winding 423 charging and discharging the parasitic capacitances associated with node 130B, causing the voltage $V_{2B}$ to increase until it is clamped by the internal body diode (not shown) in switch Q1B to be essentially equal to the voltage across input terminals 420, 421 of the main-input cell 402, leaving the voltage across Q1B essentially zero in preparation for ZVS turn ON. Because nodes 130A and 130B and nodes 132A and 132B are essentially tied together by capacitors 807 and 406, the remaining current in winding 423 also charges and discharges the parasitic capacitances associated with node 130A, causing the voltage $V_{2A}$ to increase until it is clamped by the internal body diode in switch Q1A to be essentially equal to the voltage across auxiliary cell 801 input terminals 410 and 411, preparing Q1A for ZVS turn ON in the auxiliary cell 801.

Switch Q1 is turned on again at the end of ZVS phase C (time $t_o+T_{M1}$), initiating the beginning of a new energy-storage phase of a new converter operating cycle. Because switch Q1 turns ON at zero voltage, it does so essentially without loss. The next converter operating cycle in Mode 1 proceeds through the same six phases described above: an energy-storage phase; ZVS phase A; an energy-transfer phase; ZVS phase B; a clamp phase; and ZVS phase C.

Although the multi-input cell converters of FIGS. 6 and 8 are shown using an adaptive integrated converter topology based upon the DCZVS converter topology, an adaptive DC-DC converter array based upon other DC-DC topologies (e.g., flyback and active clamped flyback converter topologies) may also be used. For example, an integrated DC-DC Converter array based upon a flyback topology having 2 input cells, an output cell, and a common transformer may be realized by omitting switches Q1A 414, Q1B 424, Q2B 425, Diode 815 and by connecting the starts of windings 413 and 423 to nodes 410 and 420, respectively, in FIG. 8. Although there may be efficiency and other performance penalties as compared to the DCZVS topology, the integrated hard-switching flyback array and active clamp flyback array may still provide some of the benefits of reduced voltage and current stresses on the primary switches. Alternatively, multi-cell integrated converters based upon the DCZVS and other DC-to-DC converter topologies, such as the flyback and active clamp flyback topologies mentioned above, may be used in fixed-cell or non-adaptive configurations. For example, an integrated multi-input cell DCZVS converter having the input cells hard wired for a series connection may be used to converter high input voltages down to much lower output voltages employing lower voltage, better figure of merit, components to achieve greater efficiency.

A number of embodiments of the invention have been described. Nevertheless, it will be understood that various modifications may be made without departing from the spirit and scope of the invention. For example, . . . .

Accordingly, other embodiments are within the scope of the following claims.

What is claimed is:

1. A method of converting power from a source at an input voltage for delivery to a load at a controlled output voltage, where the input voltage may vary between a high line voltage and a low line voltage, comprising:

providing a converter array having an input, an output, and a first input cell and a second input cell, each input cell having a respective number, $P_x$, of turns and an output cell having a respective number, $S_x$, of turns;

providing magnetic coupling between the turns to form a transformer common to the cells, wherein the turns of the first and second input cells form first and second primary windings and the turns of the output cell forms a secondary winding; and providing a circuitry to operate the cells in a series of converter operating cycles, each converter operating cycle including:

(a) transferring energy from the input to the transformer via the primary windings during an energy-storage phase characterized by (i) an average value of primary current flowing in the primary windings, the average value of primary current having a first polarity, (ii) by an average increase in energy stored in the transformer, the averages being taken over the duration of the energy-storage phase and being greater than zero;

(b) transferring energy from the transformer via said secondary winding to the load during an energy-transfer phase characterized by an average decrease in energy stored in the transformer, the average being taken over the duration of the energy-transfer phase and further characterized by a complete or a substantial absence of temporal overlap with the energy-storage phase;

configuring the input cells in a parallel connection for operation at the low line voltage and in a series connection for operation at the high line voltage; and providing circuitry to control the output voltage.

2. The method of claim 1 wherein:

each input cell is driven by a voltage essentially equal to the input voltage in the parallel connection; and each input cell is driven by a voltage essentially equal to one-half of the input voltage in the series connection.

3. The method of claim 2 further comprising providing primary switches having a maximum voltage rating that is lower than the high line voltage.

4. The method of claim 1 further comprising providing a circuit to sense the input voltage and to automatically configure the input cells in the series or parallel connections in response to the input voltage.

5. The method of claim 1 wherein each energy-transfer phase is further characterized by connecting a clamp capacitor to the transformer.

6. The method of claim 5 wherein the connecting further comprises using a switch to connect the clamp capacitor to a second end of at least one of the primary windings and further comprising providing capacitive coupling between the second end of the at least one primary winding to a second end of the other primary winding, wherein the second ends are respectively poled.

7. The method of claim 5 wherein the transferring energy during the energy-transfer phase further comprises forming a resonant circuit between a primary-referenced leakage inductance of value $L_L$ and the clamp capacitor of value $C_C$, the resonant circuit having a characteristic time constant, $T_R = \text{pi} * \text{sqrt}(L_L * C_C)$, and the converter operating cycle comprises a minimum operating period, $T_{oc-min}$, that is greater than the characteristic time constant $T_R$.

8. The method of claim 5 further comprising setting the capacitance of the clamp capacitor to control the slew rate of a current in the secondary winding to enable a switch connected to the secondary winding to be turned ON under conditions of essentially zero voltage and at a current less than a peak value of the current in the secondary winding.

9. The method of claim 5 wherein the clamp capacitor is connected to the primary winding during the energy-transfer phase.

10. The method of claim 1 wherein each converter operating cycle further comprises:
(c) clamping at least one of the first and second primary windings of the transformer during a clamp phase characterized by essentially zero voltage across and an average value of current flowing in the clamped primary winding, the average value of current having a second polarity, wherein the average is taken over the duration of the clamp phase and the second polarity is opposite of the first polarity.

11. The method of claim 10 further comprising providing a power factor correction circuit.

12. The method of claim 10 further comprising charging and discharging parasitic capacitances during a first ZVS phase following the end of the clamp phase.

13. The method of claim 10 wherein the clamping further comprises clamping the first and second primary windings.

14. The method of claim 13 wherein the clamping further comprises using a clamp switch on a first end of one of the primary windings and a unidirectional conduction device on a first end of the other of the primary windings, wherein the first ends are respectively poled.

15. The method of claim 1 wherein each converter operating cycle further comprises ZVS transitions during which parasitic capacitances associated with first primary switches connect to a first end of a respective primary winding or second primary switches connected to a second end of a respective primary winding are charged or discharged to allow each respective primary switch to be turned ON or OFF at times when the voltage across said respective primary switch is essentially at or near a minimum.

16. The method of claim 15 wherein each converter operating cycle further comprises
a first ZVS transition of the first primary switches, during which transitions in the second primary switches are delayed;
a second ZVS transition of the second primary switches following the first ZVS transition, wherein the second ZVS transition commences essentially at the end of the first ZVS transition.

17. The method of claim 16 further comprising a brief conduction state immediately following the first ZVS transition and immediately preceding the second ZVS transition, the conduction state being characterized by essentially zero voltage across and an average value of current flowing in the primary winding, the average value of current having the first polarity.

18. A method of converting power from an input source at an input voltage for delivery to a load over a normal operating range, comprising:
providing a switching power converter array having an input, an output, a number, N, of input cells, and a number, M, of output cells, where M+N is greater than 2;
providing each input cell with a primary winding having a respective number, $P_x$, of turns and at least one primary switch to drive the primary winding;
providing each output cell with a secondary winding having a respective number, $S_x$, of turns;
providing magnetic coupling between the windings to form a transformer common to each of the input and output cells;
stacking at least two of the cells, wherein each stacked cell is connected in series with the other stacked cells and each stacked cell shares a respective fraction of the input or output voltage according to its respective number of turns;
providing circuitry to operate the cells in a series of converter operating cycles during which power received from the input is converted via the transformer for delivery to the load.

19. The method of claim 18 wherein the number, N, of input cells is 2 or more and the input cells are stacked to share the input voltage.

20. The method of claim 18 wherein the number, M, of output cells is 2 or more and the output cells are stacked to share the output voltage.

21. The method of claim 19 wherein each converter operating cycle comprises:
(a) transferring energy from the input to the transformer via the primary windings during an energy-storage phase characterized by (i) an average value of primary current flowing in the primary windings, the average value of primary current having a first polarity, (ii) by an average increase in energy stored in the transformer, the averages being taken over the duration of the energy-storage phase and being greater than zero;
(b) transferring energy from the transformer via said secondary winding to the load during an energy-transfer phase characterized by an average decrease in energy stored in the transformer, the average being taken over the duration of the energy-transfer phase and further characterized by a complete or a substantial absence of temporal overlap with the energy-storage phase; and
further comprising providing circuitry to control the output voltage.

22. The method of claim 21 wherein each energy-transfer phase is further characterized by connecting a clamp capacitor to the transformer and wherein each converter operating cycle further comprises:
(c) clamping at least one of the primary windings of the transformer during a clamp phase characterized by essentially zero voltage across and an average value of current flowing in the clamped primary winding, the average value of current having a second polarity, wherein the average is taken over the duration of the clamp phase and the second polarity is opposite of the first polarity; and further comprising setting the capacitance of the clamp capacitor to control the slew rate of a current in the secondary winding(s) to enable a switch connected to the secondary winding(s) to be turned ON under conditions of essentially zero voltage and at a current less than a peak value of the current in the secondary winding(s).

23. The method of claim 22 wherein the transferring energy during the energy-transfer phase further comprises forming a resonant circuit between a primary-referenced leakage inductance of value $L_L$ and the clamp capacitor of value $C_C$, the resonant circuit having a characteristic time constant, $T_R = pi*sqrt(L_L*C_C)$, and the converter operating cycle comprises a minimum operating period, $T_{oc-min}$, that is greater than the characteristic time constant $T_R$.

24. The method of claim 19 further comprising:
  forming a resonant circuit including the transformer and having a characteristic resonant frequency and period; and
  wherein each converter operating cycle is characterized by
  (a) two power transfer intervals of essentially equal duration, during which one or more of the primary switches are ON and power is transferred from the input cells to the output cell(s) via the transformer, and voltages and currents in the input cells and output cell(s) rise and fall at the characteristic resonant frequency; and
  (b) two energy-recycling intervals each having an essentially constant duration over the normal operating range during which the primary switches are OFF; and
  further comprising using magnetizing current to charge and discharge capacitances during the energy-recycling intervals.

25. The method of claim 19 further comprising providing the primary switches with a maximum voltage rating that is lower than the input voltage.

* * * * *

UNITED STATES PATENT AND TRADEMARK OFFICE
CERTIFICATE OF CORRECTION

| | | |
|---|---|---|
| PATENT NO. | : 7,782,639 B2 | Page 1 of 1 |
| APPLICATION NO. | : 11/932647 | |
| DATED | : August 24, 2010 | |
| INVENTOR(S) | : Patrizio Vinciarelli | |

It is certified that error appears in the above-identified patent and that said Letters Patent is hereby corrected as shown below:

On the Title Page
Item (56) OTHER PUBLICATIONS, line 4, delete "Conversino"" and insert -- Conversion," --.

Col. 1, after the title insert -- CROSS-REFERENCE TO RELATED APPLICATIONS --.

Col. 8, line 45, delete "Vo," and insert -- $V_o$, --.

Col 10, line 57, delete "4510N" and insert -- 451 ON --.

Col. 18, line 16, delete "For example, . . . .".

Signed and Sealed this
Twenty-fourth Day of April, 2012

David J. Kappos
*Director of the United States Patent and Trademark Office*